United States Patent [19]

Ruzumna

[11] Patent Number: 4,773,492

[45] Date of Patent: * Sep. 27, 1988

[54] APPARATUS FOR PROMOTING GOOD HEALTH

[76] Inventor: Edward Ruzumna, 3974 Winterset Ct.,, West Bloomfield, Mich. 48033

[*] Notice: The portion of the term of this patent subsequent to Mar. 22, 2003 has been disclaimed.

[21] Appl. No.: 29,654

[22] Filed: Mar. 24, 1987

[51] Int. Cl.⁴ ...................... G01G 19/44; G01G 19/52
[52] U.S. Cl. ......................................... 177/25; 177/245
[58] Field of Search ................. 177/25.19, 5, 200, 245

[56] References Cited

U.S. PATENT DOCUMENTS

| | | | |
|---|---|---|---|
| 4,301,879 | 11/1981 | Dubow | 177/5 |
| 4,366,873 | 1/1983 | Levy et al. | 177/25.19 |
| 4,423,792 | 1/1984 | Cowan | 177/25.19 |
| 4,577,710 | 3/1986 | Ruzumna | 177/25.19 |
| 4,674,060 | 6/1987 | Larkin et al. | 177/200 X |

Primary Examiner—George H. Miller, Jr.
Attorney, Agent, or Firm—Rhodes and Boller

[57] ABSTRACT

An electronic personal weight scale for conveying weight information including health-promoting messages based on departure of measured weight from ideal weight. Information relating to a particular person using the scale is contained in a cartridge in electronic form. The information comprises the person's ideal weight and messages related to the amount by which the person's measured departs from the ideal. The cartridge also contains provision for storing past weight measurements. When the person steps on the scale and selects his or her cartridge, weight information and messages are presented on a display screen which is a portion of a television receiver. A selector switch enables the apparatus to operate in the "Scale" mode and in the "TV" mode.

9 Claims, 4 Drawing Sheets

FIG. 2

- WEIGHT ONLY
- PERSON "A"
- PERSON "B"
- PERSON "C"
- PERSON "D"
- PERSON "E"

FIG. 3

YOUR CURRENT WEIGHT IS: 119
YOUR PAST FIVE WEIGHTS ARE: 120, 124, 122, 120, 121
YOUR OVERWEIGHT IS: 2

FIG. 4

CONGRATULATIONS! YOU'RE ALMOST THERE!!

APPARATUS FOR PROMOTING GOOD HEALTH

BACKGROUND AND SUMMARY OF THE INVENTION

This invention relates to improvements in a personal weight scale which conveys health awareness messages for persons using the scale based upon departures of a person's actual weight from what is deemed to be an ideal weight for that person. In certain respects the invention of this application is an improvement upon the Applicant's patent of the same title, U.S. Pat. No. 4,577,710, issued Mar. 25, 1986.

The importance of a person's weight to that person's health is generally recognized. Moreover, where the person suffers from one or more of certain types of medical conditions, weight can have an even more important effect on the person's health. This is discussed in detail in the Applicant's aforementioned patent, and one of the purposes of the present invention is to provide further enhancements in this type of equipment.

According to one aspect of the present invention, a personal weight scale of the aforementioned type is adapted to general family use for conveyance of health-promoting, weight-related messages to certain individuals who need or wish to receive such messages and for conveyance of weight information alone to others who may not need or wish to receive such messages. According to another aspect of the invention, a personal weight scale apparatus is associated with a television receiver whose screen is used to display health-promoting, weight-related messages from the personal weight scale apparatus when the "Scale" mode of operation is selected. When a "TV" mode of operation is selected, the television receiver can be operated to receive television transmissions of television programs and present them on the screen. Still further aspects of the invention relate to the manner of its implimentation and to its particular details.

The foregoing features, advantages, and benefits of the invention will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 2 is a view of a portion of the apparatus illustrating principles of one part of the operating sequence.

FIG. 3 is a view of the same portion as in FIG. 2, but illustrating a further part of the operating sequence.

FIG. 4 is a view similar to FIGS. 2 and 3 illustrating a further portion of the operating sequence.

DESCRIPTION OF THE PREFERRED EMBODIMENT

Figure 1:
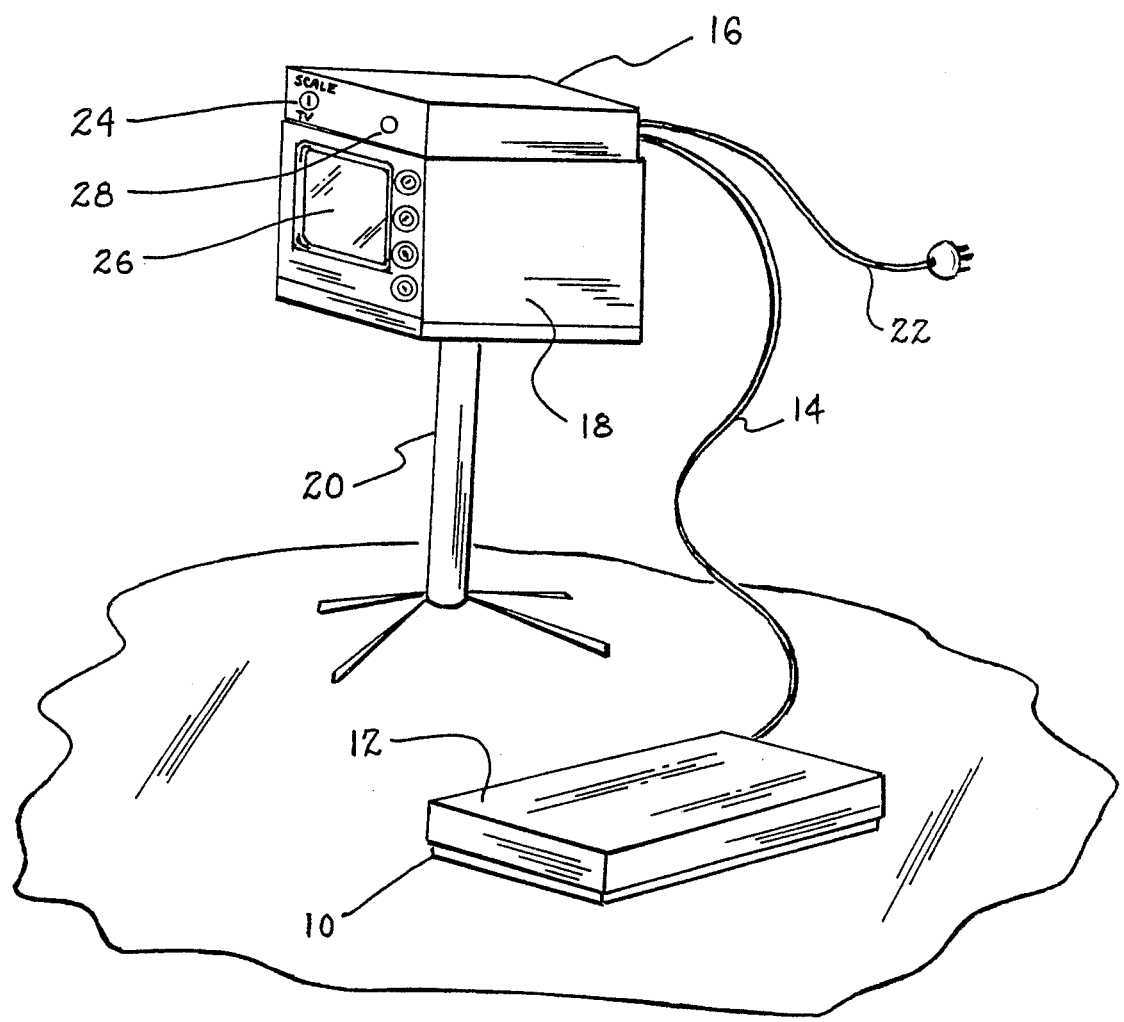
FIG. 1 is a perspective somewhat diagrammatic view of representative apparatus embodying principles of the present invention.

FIG. 1 shows an electronic scale 10 having a platform 12 onto which a person steps when he or she wishes to obtain a measurement of his or her current weight. The scale provides an electrical signal output representing the measured weight, and this signal is supplied via a conductor cable 14 to a console 16 which is mounted on the exterior of a television receiver 18. The scale 10 typically rests on the floor, and the television receiver 18 is supported from the floor at a level higher than that of the scale by means of a pedestal, or equivalent support, 20. Although the scale is shown in the drawing as separate from the pedestal 20, the aforementioned parts of the apparatus could be integrated into a single unit.

The apparatus is electrically powered from a conventional household wall receptacle by plugging a power cord 22 of the apparatus into such a receptacle. The television receiver 18 is conventional and comprises its own controls. However, operation of television receiver 18 is interlocked with the operation of the scale in the following way. Associated with the apparatus is a selector switch 24, which is preferably on console 16 as shown. Normally the switch is in the "Scale" position which allows the scale 10 and its associated electronics to operate; it also allows information relating to use of the scale to be displayed on the screen 26 of television receiver 18, but it prevents any television signals received by the receiver from appearing on screen 26. Hence, in this mode of operation, only information relating to use of the scale is allowed to appear on the screen.

Switch 24 is also operable to a "TV" position, and when in that position prevents information developed from the use of scale 26 from being displayed on the screen, and instead allows the television receiver to display television programs as selected by the usual channel selector on the television receiver. The particular manner in which the selector switch is connected into the television receiver circuit and the circuitry in console 16 will be a matter of convenience. One way to make the connection is by interposing selector switch 24 between the front end of the television receiver's own circuitry and the drives to the screen such that for the "TV" position the front end remains coupled to the drives for the screen and for the "Scale" position, the front end is disconnected from the drives and replaced by the scale's electronics.

According to this aspect of the invention which has just been described, the apparatus has enhanced utility because it provides both weight-related information when used as a scale and entertainment when used as a television.

In the "Scale" position, the apparatus operates in the following way when a person steps on scale platform 12. Information, such as appears in FIG. 2, is presented. The illustration of FIG. 2 is intended to be representative of an embodiment which can be used by a number of different family members, five being the number of this example. The five members are designated by the references A, B, C, D, E. There is also a general reference designated "Weight Only".

If the person using the scale is one of the family members, he or she operates a switch 28 to select the particular family member reference which has been assigned to him or her from the choices appearing on the screen (FIG. 2). Otherwise, if the person makes no selection, the "Weight Only" measurement is given so that nothing more than the person's measured weight appears on the screen. If however the person has selected his or her assigned family reference, then the apparatus presents additional screens based on certain information unique to the person. FIGS. 3 and 4 illustrate representative sequences of information appearing on the screen.

FIG. 3 shows the following information being presented on the screen: the person's present weight; the person's last five recorded weights; and the amount by which the person's present measured weight departs from an ideal weight which has been established for the person.

FIG. 4 is a screen subsequent to the screen of FIG. 3 and displays a message which has been adapted particularly for the person based on the amount by which the person's measured weight departs from the ideal weight which has been established for him or her. This is intended to be a psychological reinforcement for the person, assisting in the attainment of ideal weight for the individual.

Figure 5:
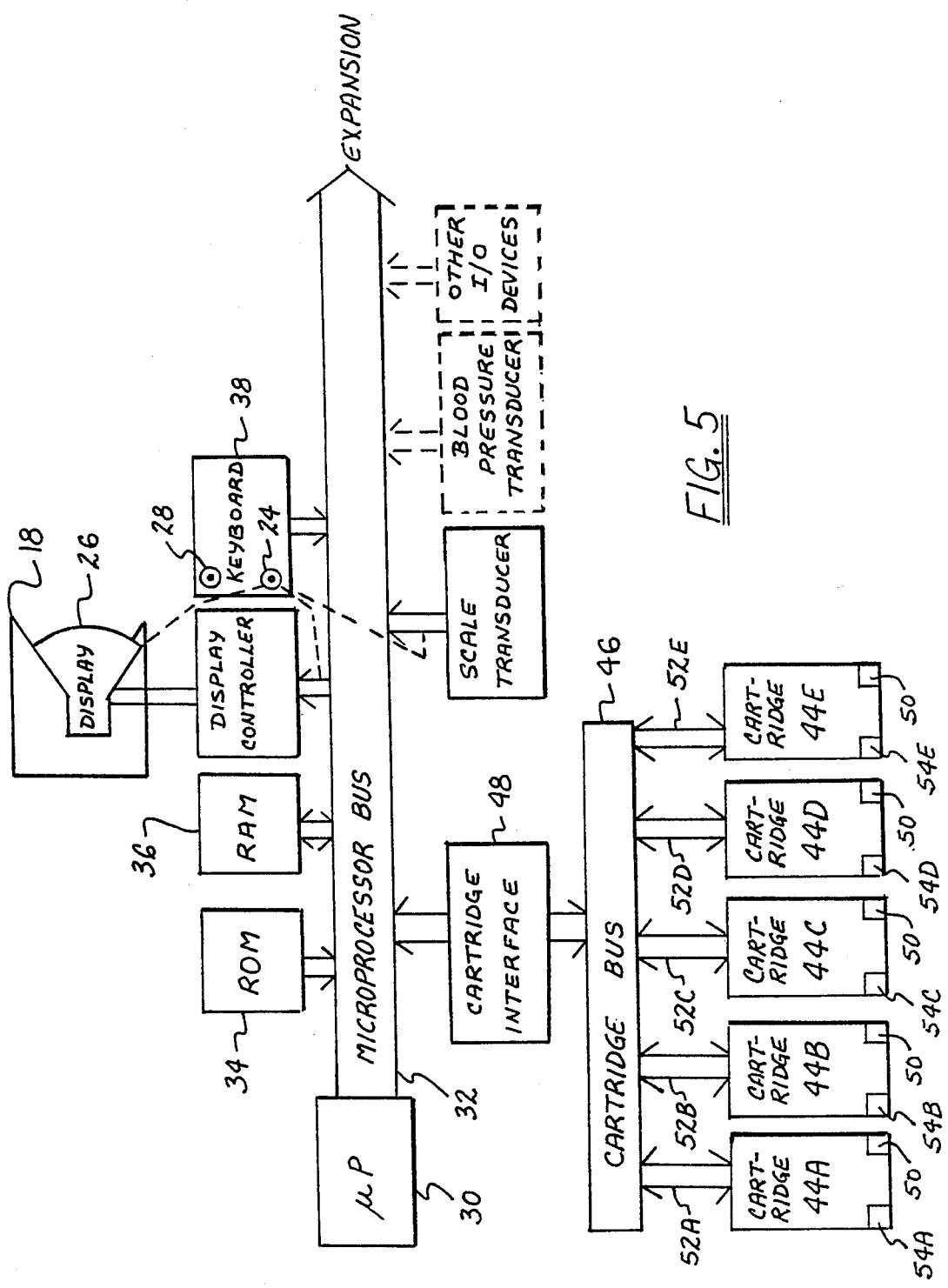
FIG. 5 is a schematic diagram illustrating the electronic hardware used in the preferred embodiment of the invention.

FIG. 5 shows exemplary electronic hardware used in the apparatus. For the most part this hardware is contained within console 16. It comprises a microprocessor 30 having the usual control and data busses, collectively referred to as the microprocessor bus 32. A number of devices are associated with the microprocessor via bus 32, including read only memory (ROM) 34, random access memory (RAM) 36, and a keyboard 38. The scale 10 is on bus 32, and the screen 26 of television receiver 18 is selectively associated with the bus when the selector switch 24 is in the "Scale" position and with the front end of the television receiver when the switch is in the "TV" position. Also on the bus 32 is a selected one of a series of individual cartridges 44A, 44B, 44C, 44D, and 44E, which share a common cartridge bus 46 which in turn interfaces with microprocessor bus 32 via a cartridge interface 48. Optional accessory devices such as those portrayed by the broken lines may also be on the microprocessor bus.

In general, the operation of the microprocessor-based system is like that described in the referenced patent when a weight measurement is being taken and information related thereto is being displayed in consequence of the weight measurement. Certain aspects of the system disclosed herein are improvements over the earlier system.

Each cartridge is a device, such as a ROM or PROM (Programmable Read Only Memory), which is programmed with information for a particular family member. The cartridge contains the ideal weight for the person, and it also contains certain messages for the person correlated with the departure of the person's actual measured weight from the person's ideal weight. Each cartridge further contains stores 50 for storing a finite number of past weight measurements of the person. The cartridges may be removably mounted in respective receptacles 52A–E on console 16, and may contain battery back-up 54A–E for memory retention of past recorded weight measurements whenever the cartridge is removed from the console. This removability of the cartridges is a convenience, since it enables a person to use plural apparatus with a single cartridge, and it enables the person to maintain secrecy of his or her own information by removing the cartridge and taking it with himself or herself after use. Of course, a cartridge can be left in the apparatus for repeated use. Cartridge substitution is also facilitated when a person requires new ideal weight or messages.

An especially important aspect of the invention relates to use of the apparatus as an aide in treatment of a medical condition where the condition bears a recognized correlation with departure of actual weight from ideal weight for the person involved. Certain details of this aspect are explained in the aforementioned patent, and will not be repeated here in the interest of brevity. Suffice it to say that for the purpose of promoting good health in certain individuals having certain medical conditions each cartridge is pre-programmed with a series of messages related to the condition. These conditions are other than merely overweight or underweight, for example, a cardiac condition, a diabetic condition, or pregnancy, and the messages are tailored to the particular condition or conditions of interest. The particular message displayed, such as on the screen of FIG. 5, will depend upon the amount of departure of actual measured weight from the person's ideal weight. In general the greater the departure, the sterner the message. Examples are given in the aforementioned patent. Importantly, the invention enables a regimen to be prescribed by an attending professional such as a physician. The professional will have made a diagnosis of the individual's condition or conditions and for the person's age, sex, and frame will establish the person's ideal weight. The professional will also typically have some idea of what sort of messages will be useful in motivating the particular individual to attain the ideal weight. The ideal weight and the messages will be programmed into the individual's own cartridge with the expectation that through use, the person will attain the ideal weight. The ability to preprogram the messages gives the opportunity for a custom tailoring of messages to any particular individual. If subsequent visits to the attending professional show that less than satisfactory progress is being achieved, then the messages can be changed in an attempt to provide better motivation.

A further feature is that each cartridge contains a limited history of the person's actual weights. This is accomplished by allotting several memory stores 50 in each cartridge for recording the person's weight each time it is take. Because there are a finite number of stores, a new weight measurement will supplant the oldest stored measurement once all stores are full. These stored weights are also intended to be motivational to the individual, particularly by the manner in which they are presented in the disclosed embodiment. This manner comprises displaying the past weight measurements at once on the display on the same screen as the present measurement and the amount of over or under-weight is displayed. (See the example of FIG. 3)

Figure 6:
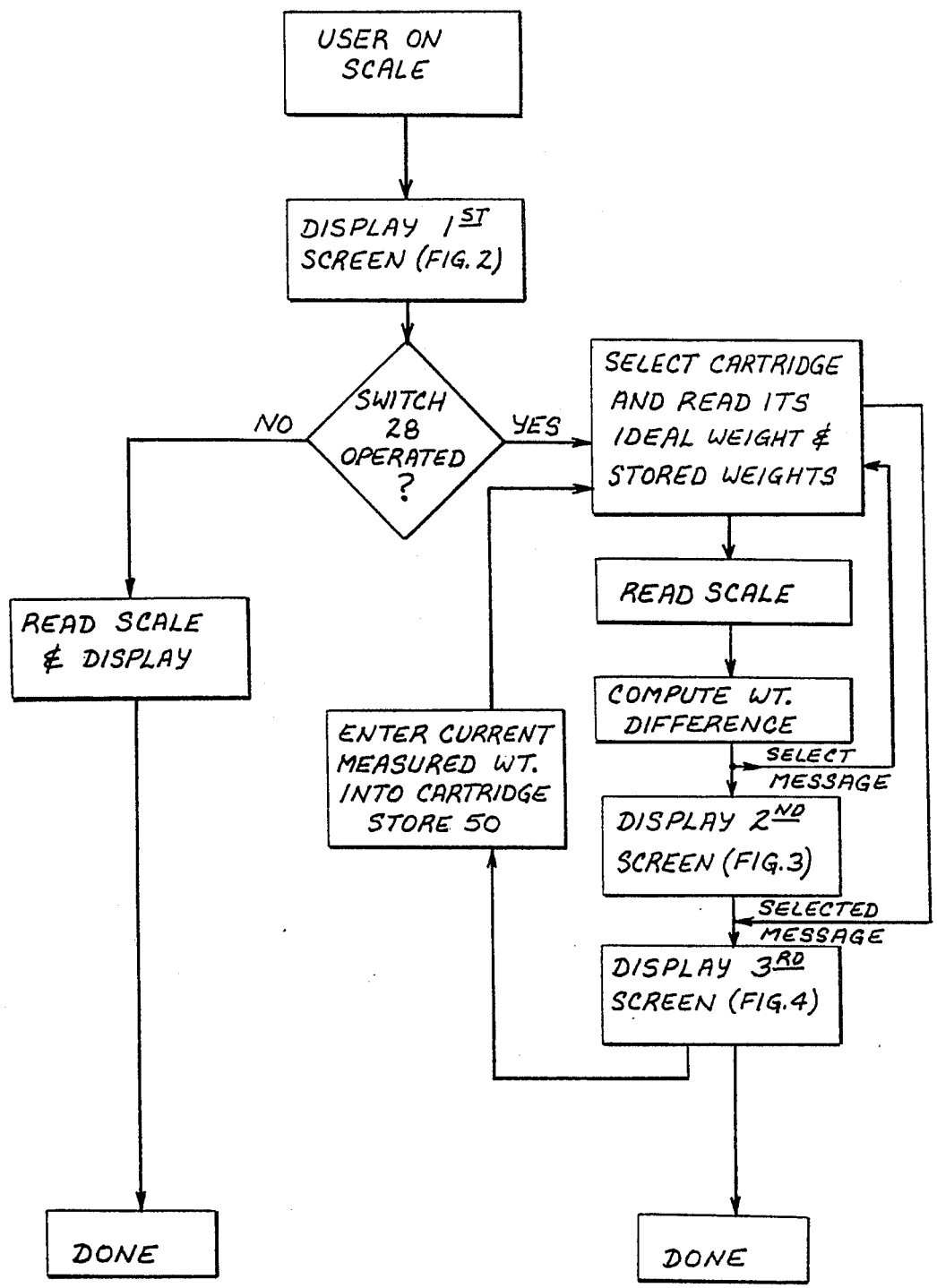
FIG. 6 is a flow diagram illustrating operation of the electronic hardware with reference to FIGS. 1 through 5.

FIG. 6 portrays a flow diagram representative of the foregoing description. It splits into two separate paths near the beginning depending upon the selection of the "Weight Only" mode or the more detailed mode incident to the designation of a particular individual, resulting from the selection of the associated individual cartridge for that particular person. In the "Weight Only" mode, the display presents nothing more than the person's weight when he or she steps on the scale.

When a particular cartridge is selected via the use of switch 28 using the first screen (FIG. 2) which is presented when the person first steps on the scale, then the apparatus presents subsequent screens as represented by FIGS. 3 and 4. These are intended to aid the individual in attainment of a weight goal, and in maintenance of the weight once the goal has been attained. While the use of custom cartridges correlated to particular individuals with particular medical conditions is an important use, it is to be appreciated that certain aspects of the invention do not depend upon that aspect, but are for general weight control purposes without any aspect of aiding other than a condition of over- or under-weight.

While a preferred embodiment of the invention has been disclosed, it will be appreciated that principles are applicable to other embodiments. For example, the apparatus including the television receiver could be powered by a self-contained battery, preferably rechargeable, thereby avoiding the need to have the apparatus continuously plugged into a wall receptacle.

What is claimed is:

1. Apparatus for promoting good health and addressing both the user's weight and a particular medical condition other than departure of the user's weight from an ideal weight but which bears a recognized correlation with departure of a user's weight from ideal weight comprising a scale having a platform onto which the user steps, a display for displaying information to the user, and control means acting on the measured weight of the user and certain other inputs, including an electronic medium which is manually installable on and removable from the apparatus and containing data relating to the particular medical condition correlated with departure of measured weight from ideal weight to provide motivational messages on the display relating to both departure of the user's measured weight from ideal weight and to the particular medical condition with respect to which departure of measured weight from ideal weight has a recognized correlation, the particular message presented on the display relating to the particular medical condition being developed from departure of the user's measured weight from ideal weight, wherein said display is the screen of a television receiver, and including a selector switch for selectively connecting the television receiver's screen to the scale when weight and messages are to be given upon use of the scale and to the front end of the receiver when the receiver is to present television programs received as television transmission signals.

2. Apparatus as set forth in claim 1 in which said electronic medium comprises stores for storing a limited number of past weight measurements, and a battery back-up for maintenance of the stores' memory during times that the medium is removed from the apparatus.

3. Apparatus as set forth in claim 2 in which said control means comprises means for causing the past weight measurements to be presented at the same time on the display as the current weight information.

4. Apparatus as set forth in claim 3 in which said control means comprises means for causing the motivational message to be given on the display after the past weight measurements and the current weight information.

5. Apparatus as set forth in claim 1 in which said apparatus comprises a microprocessor having a bus connecting the microprocessor with the electronic medium, and the connection of the microprocessor bus to the medium is via a further bus on which there are plural ones of said electronic media and said further bus is coupled with the microprocessor bus via a interface such that a particular one of the media is placed on-line with the microprocessor bus at any given time via the further bus and said interface.

6. Apparatus for promoting good health comprising a scale which provides electrical signals representing a person's weight, an electronic medium which is individual to a particular person and which is inserted into the apparatus prior to use thereof by the person and is removed from the apparatus after use thereof by the person, said medium comprising a series of message stores that contain stored motivational messages adapted for the person, said medium further comprising a series of weight data stores for storing a limited number of past recorded weights for the person, and said medium still further comprising an ideal weight store for storing an ideal weight for the person, and said apparatus comprising means operable when the scale is used by the person to act upon the person's measured weight and the information in said stores of said medium for causing to be displayed on a display the person's current measured weight, the departure from ideal weight, the stored past weights, and a motivational message based on departure of current measured weight from ideal weight, and for causing the current measured weight to be stored in the weight data stores, the weight data stores being arranged to supplant the oldest weight with the current weight once all weight data stores have been filled with weight measurements.

7. Apparatus as set forth in claim 6 in which the current weight and the past recorded weights are concurrently displayed, and the motivational message based on departure of current measured weight from ideal weight is given after the current and past weight measurements.

8. Apparatus as set forth in claim 7 in which said display is part of a television receiver, and including a selector switch for selectively connecting the television receiver's screen to the scale during use of the scale for weight measurement and to the front end of the television receiver for use of the receiver to receive television transmissions of television programs and to present the programs.

9. Apparatus for promoting good health by addressing the user's weight and departure of the user's weight from an ideal weight comprising a scale having a platform onto which the user steps, and control means acting on the measured weight of the user and certain other inputs, including inputs from an electronic medium which is manually insertable into and removable from the apparatus by the user and which contains data that is unique to the user including an ideal weight store for storing ideal weight of the particular user and message stores that contain stored motivational messages adapted for the particular user correlated with departure of the particular user's measured weight from ideal weight, and said apparatus further including a television receiver comprising a screen and wherein said control means is contained in a console that is mounted on the exterior of the television receiver and said console contains receptacle means into and from which the electronic medium is insertable and removable by the user, said console containing a TV/scale selector switch that is selectively operable to a TV position and to a scale position, and when in the scale position, allows information relating to use of the scale to be displayed on the screen while preventing any television signals received by the receiver from appearing on the screen, and when operated to the TV position, prevents information developed from use of the scale from being displayed on the screen and instead allows the television receiver to display television programs as selected by the channel selector on the television receiver, said TV/scale selector switch being interposed between the front end of the television receiver's own circuitry such that in the TV position, the front end of the television receiver's own circuitry remains coupled to the screen, and in the scale position, the front end is disconnected from the screen and replaced instead by said control means, said control means being effective with the selector in the scale position to cause to be displayed on the television receiver screen in response to the user stepping on the platform, the user's measured weight, the user's ideal weight and a motivational message derived from departure of the measured weight from ideal weight.

* * * * *